US006267428B1

(12) United States Patent
Baldas et al.

(10) Patent No.: US 6,267,428 B1
(45) Date of Patent: Jul. 31, 2001

(54) OVERHEAD CONSOLE FOR MOTOR VEHICLE

(75) Inventors: Jason Paul Baldas, Warren; Tracy Lee Simpson, Ferndale; Hitoshi Ohashi, West Bloomfield; Gerald Oscar Morrison, Beverly Hills; Gregory W. Alfano, White Lake; William Edwin Palaski, Armada; Richard David George, Rochester Hills; Eileen Marie Avram, Canton, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/474,239

(22) Filed: Dec. 29, 1999

(51) Int. Cl.⁷ ..................................................... B60N 3/12
(52) U.S. Cl. ...................... 296/37.7; 296/37.8; 296/37.1
(58) Field of Search .................................. 296/37.7, 37.8, 296/37.1

(56) References Cited

U.S. PATENT DOCUMENTS

| D. 340,215 | 10/1993 | Falcoff . | |
|---|---|---|---|
| D. 413,856 | 9/1999 | Scribner . | |
| 4,100,372 | * 7/1978 | Hypolite ............................... | 296/37.7 |
| 4,133,405 | 1/1979 | Turek . | |
| 4,241,870 | * 12/1980 | Marcus ................................ | 296/37.7 |
| 4,684,164 | * 8/1987 | Durham .............................. | 296/37.7 |
| 4,818,010 | * 4/1989 | Dillon ................................. | 296/37.7 |
| 4,888,072 | * 12/1989 | Ohlenforst et al. ................. | 296/37.7 |
| 5,040,990 | * 8/1991 | Suman et al. ....................... | 296/37.7 |
| 5,050,922 | * 9/1991 | Falcoff ................................ | 296/37.7 |
| 5,062,559 | 11/1991 | Falcoff . | |
| 5,303,970 | * 4/1994 | Young et al. ....................... | 296/37.7 |
| 5,310,237 | * 5/1994 | McCloy, II et al. ................ | 296/37.7 |
| 5,469,298 | * 11/1995 | Suman et al. ....................... | 296/37.8 |
| 5,713,623 | * 2/1998 | Mattingly ........................... | 296/37.8 |
| 5,927,784 | 7/1999 | Vitito . | |
| 6,003,925 | * 12/1999 | Litke et al. ......................... | 296/37.7 |

* cited by examiner

Primary Examiner—Joseph D. Pape
Assistant Examiner—Kiran B. Patel
(74) Attorney, Agent, or Firm—MacMillan, Sobanski & Todd, LLC

(57) ABSTRACT

A modular overhead console assembly for attachment to a vehicle roof which can be formed by attaching a plurality of modules having different controls and convenience packages. Preferably, the console assembly includes a main console and at least one wing portion. The main console is attached to the roof and extends longitudinally along the roof. The wing portion extends from a side of the main console towards a lateral edge of the roof. The wing portion is positioned behind and adjacent a visor pivotally attached to the roof.

11 Claims, 2 Drawing Sheets

OVERHEAD CONSOLE FOR MOTOR VEHICLE

BACKGROUND OF THE INVENTION

This invention relates in general to vehicle interior consoles, and in particular to a modular overhead console assembly having side wing portions extending from a main console.

Some passenger vehicles include overhead consoles which are attached to the roof of the vehicle. Typically, overhead consoles are centrally located along the longitudinal axis of the roof and extend towards the rear of the vehicle from a front edge of the roof panel, adjacent the windshield. Consoles can be equipped with various displays, controls, and convenience features accessible to the occupants of the vehicle. For example, some consoles include controls for a climate control system, driver information display screens, light modules, and small storage compartments.

Overhead consoles are manufactured in various lengths, depending on the features included in the console. For example, a console having just light modules a driver information display can have a longitudinal length of only about 10 centimeters. Other consoles having more features, such as multiple storage compartments and controls for various systems of the vehicle, can extend into the rear portion of a passenger compartment of the vehicle, behind the front occupant' heads. Generally, the longitudinal length of the consoles is limited to the typical reach of a front occupant. Thus, the number and size of the storage compartments is limited.

Typically, overhead consoles include a single plastic housing extending along the entire length of the console. The housing includes slots or openings formed therein for receiving the controls, displays, or access doors for storage compartments. Generally, a single console is designed for each particular vehicle platform due to the difference in the shapes and sizes of the roof panels. In some vehicle platforms, the overhead console is an optionally purchased feature of the vehicle. Since the overhead console is a singular unit formed from a single housing, the purchaser of the vehicle must elect to buy the entire console, even though the purchaser may only want some of the features built into the console.

BRIEF SUMMARY OF THE INVENTION

This invention relates in general to a modular overhead console assembly for attachment to a vehicle roof preferably having side wing portions extending from a main console portion.

The overhead console assembly of the present invention is preferably of a modular design being formed by attaching a plurality of modules having different controls and convenience packages. Preferably, the console assembly includes a main console and at least one wing portion. The main console is attached to the roof and extends longitudinally along the roof. The wing portion extends from a side of the main console towards a lateral edge of the roof. The wing portion is preferably positioned behind and adjacent a visor pivotally attached to the roof.

Various objects and advantages of this invention will become apparent to those skilled in the art from the following detailed description of the preferred embodiment, when read in light of the accompanying drawings.

DETAILED DESCRIPTION OF THE INVENTION

Figure 1:
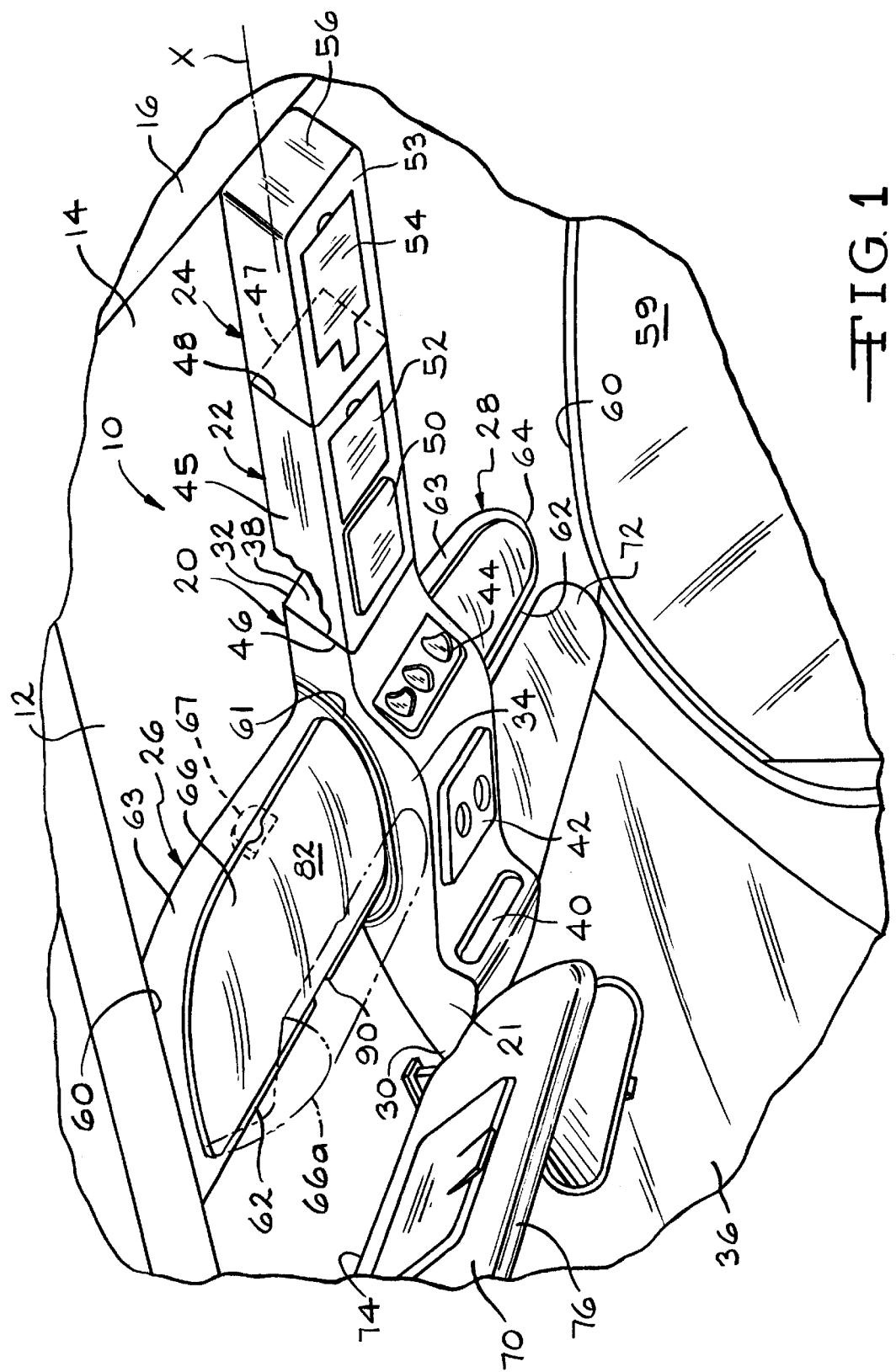
FIG. 1 is a perspective view of an interior of a vehicle having an overhead console assembly, in accordance with the present invention.
Figure 2:
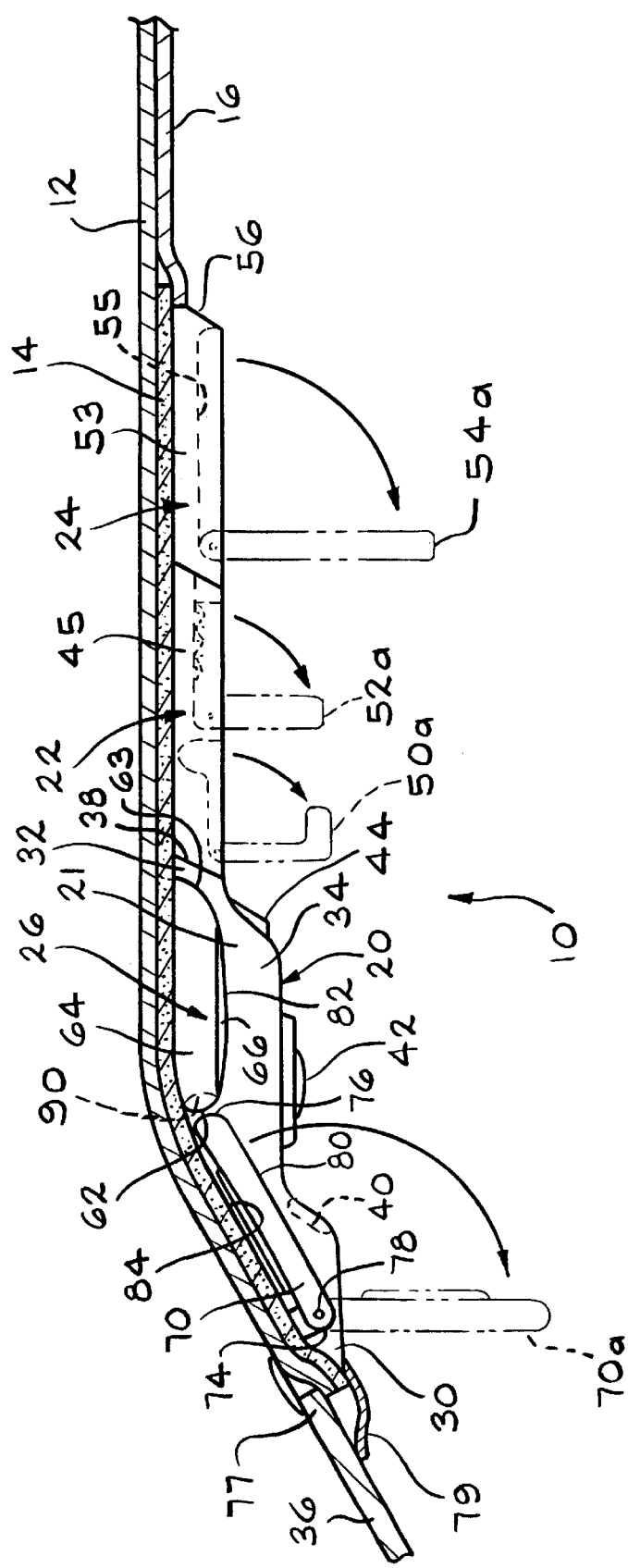
FIG. 2 is a side elevation view of the overhead console assembly of FIG. 1 which is attached to the roof, shown in cross-section.

Referring now to the drawings, there is illustrated in FIGS. 1 and 2, an overhead console assembly, indicated generally at 10, in accordance with the present invention. The console assembly 10 is attached to a roof 12. The roof 12 can include any number of headliner panels, such as first and second headliner panels 14 and 16. Note that the first headliner panel 14 is disposed between the console assembly 10 and the roof 12. Depending on the vehicle, it is sometimes easier to install multiple smaller headliner panels instead of a relatively large single panel.

The console assembly 10 is a modular design in that the console assembly 10 is constructed of multiple units or modules, wherein each module has its own housing. For example, the illustrated embodiment of the console assembly 10 includes a main console 20, a storage module 22, a video module 24, and a pair of wing portions 26 and 28. In accordance with the present invention, the console assembly 10 can be formed from the combination of any number or modules, e.g., the main console 20, the storage module 22, the video module 24, and the pair of wing portions 26 and 28. The modularity of the console assembly 10 enables a vehicle purchaser or consumer to select any number of desired modules and install them together. In the past, the consumer would have to pay for an entire console, even though the consumer may only have wanted certain features, but not all of the features of the console.

The main console 20 extends generally along a longitudinal axis X of the roof 12, as shown in FIG. 1. The main console 20 includes a housing 21 which can be made of any suitable material, such as plastic. The main console 20 and any of the other modules can be attached to the roof 12 by any suitable means, such as by threaded fasteners (not shown). The housing 21 of the main console 20 has a front end 30, a rear end 32, and sides 34. The front end 30 is positioned adjacent an upper end of a windshield 36 of the vehicle. The rear end 32 of the main console 20 is preferably closed off by a panel 38, as shown in FIG. 1. The panel 38 provides a rear end closure of the overhead console assembly 10 if modules, such as the storage portion 22, are not installed directly behind the main console 20. To provide for selective modularity of the console assembly 10, the rear ends of each module preferably include a closure panel.

The main console 20 can have any suitable shape and can include any number of various displays, controls, and convenience features. The illustrated embodiment of the main console 20, as shown in FIGS. 1 and 2, includes a driver information display 40, a light module 42, and a climate control panel 44. Although the main console 20 is shown as a single unit containing the display 40, the light module 42, and the climate control panel 44, the main console 20 could be divided into several modules. For example, the main console 20 could be divided into three housings (not shown) to form a first module having the display 40, a second module having the light module 42, and a third module having the climate control panel 44. Of course, any combination of the first, second, or third modules could be combined into single module.

The storage module 22 includes a housing 45 and is installed adjacent the rear end 32 of the main console 20. The housing 45 of the storage module 22 can have an open front end 46 positioned adjacent the rear end 32 of the main console 20. A rear end 48 of the storage module 22 preferably has a closure panel 47. Note that the storage module 22 covers the panel 38 of the main console 20. The storage module 22 can have any suitable storage compartments adapted for any purpose. For example, the storage module 22 includes a compartment covered by a pivotable door 50 ideally suited for the storage of sunglasses. The storage module 22 can also have a compartment located above a pivotable access door 52 for the storage of a garage door opener, for example. The doors 50 and 52 are shown in their open positions by phantom lines 50a and 52a, respectively in FIG. 2. Of course, the storage module 22 can have any other suitable compartments.

The console assembly 20 may also include the video module 24. The video module 24 has a housing 53. The video module 24 is provided with a flip down monitor screen 54 that is disposed in a recess 55 formed in the housing 53 when the screen 54 is in an unused stowed position, as shown in FIG. 1. The monitor screen 54 is movable to a lowered position, as shown by phantom lines 54a in FIG. 2, for the display of video images for the rear occupants of the vehicle in which the console assembly 10 is installed. Preferably, the housing 53 of the video module 24 includes a closure panel 56 at the rear end thereof.

The console assembly 10 may also include the wing portions 26 and 28. The wing portions 26 and 28 each have a housing 57 and 58, respectively. The wing portions 26 and 28 extend laterally from a respective side 34 of the main console towards one of the lateral edges 60 of the roof 12. The lateral edges 60 of the roof 12 are adjacent an upper portion of a window 59 of the vehicle. The wing portions 26 and 28 have attachment ends 61 positioned adjacent the respective sides 34 of the housing 21 of the main console 20. Since the attachment ends 61 are positioned adjacent the sides 34 of the main console and are unseen, the attachment ends 61 can be formed openly, or without a closure panel. Preferably, the sides 34 of the main console 20 do not have any openings formed therein in the vicinity where the attachment ends 61 of the wing portions 26 and 28 are positioned, so that if the wing portions 26 and 28 are not included in the console assembly 10, the sides 34 are closed for an aesthetically pleasing appearance.

The wing portions 26 and 28 have a front edge 62 and a rear edge 63. The wing portions 26 and 28 can have any desired lateral length defined between the front edge 62 and the rear edge 63. Note that the embodiment of the console assembly 10 illustrated in FIGS. 1 and 2, shows the front edge 62 and the rear edge 63 of the wing portions 26 and 28 positioned adjacent a central region of the main console 20. If desired, the wing portions 26 and 28 can be positioned anywhere along the longitudinal length of the sides 34 of the main console 20.

As shown in FIG. 1, the wing portions 26 and 28 have free ends 64 which substantially extend to the respective lateral edges 60 of the roof 12. Preferably, the free ends 64 of the wing portions 26 and 28 are spaced from the respective lateral edge 60 of the roof 12 by less than about 20 centimeters, and preferably less than about 10 centimeters. The wing portions 26 and 28 can have any desired lateral length defined between the attachment edge 61 and the free ends 64. If desired, the wing portions 26 and 28 could be formed integrally with the main console 20. Preferably, the wing portions 26 and 28 are shorter in longitudinal length compared to the main console 20 to provide head room for the front occupants of the vehicle.

Preferably, the wing portions 26 and 28 include storage compartments closed off by bin doors 66 which are pivotally fastened to the wing portions 26 and 28. The bin doors 66 pivot downwardly to a shelf-like position, as shown by phantom lines 66a in FIG. 1, for placement of articles to be stored in the wing portions 26 and 28. The bin door 66 is simply positioned upward within the respective wing portion to store the articles. The bin doors 66 can include any suitable lock mechanism, indicated schematically by lines 67 in FIG. 1, to maintain the bin doors 66 in their upward position. Of course, the wing portions 26 and 28 can have any suitable storage or door construction.

The console assembly 10 can be part of an overhead assembly which further includes a pair of visors 70 and 72. The visors 70 and 72 can be any suitable conventional visor which pivots from a stowed position to a lowered position. In FIG. 1, the visor 70 is shown in its lowered position, and the visor 72 is shown in its stowed position. In FIG. 2, the visor 70 is shown in its stowed position with solid lines, and in its lowered position indicated by phantom lines 70a. Since the visors 70 and 72 are essentially equal, only visor 70 will be described in detail below. Note that the visors 70 and 72 can be manufactured as mirror images of each other, for right and left-handed portions of the vehicle.

The visor 70 has a front edge 74 and a rear edge 76. The visor 70 pivots about a laterally extending axis, such as about a rod 78 extending through the visor 70 to move between its stowed position and its lowered position. The pivot axis of the visor 70 preferably is adjacent the front edge 74. The visor 70 may also swing from a frontal position, as shown in FIG. 1, to a side position (not shown) in a conventional manner. Preferably, the front edge 74 of the visor 70 is adjacent an upper end 77 of the windshield 36. Note that a trim piece 79 can be placed over the junction between the upper end 77 of the windshield 36 and the roof panel 14. When the visor 70 is in its stowed position, the rear edge 76 is positioned adjacent the front edge 62 of the wing portion 70. The rear edge 76 is also adjacent the roof 12 or headliner panel 14 when the visor is in its stowed position. As best shown in FIG. 2, the surface 80 of the visor 70 can be at an angle with respect to the surface 82 of the wing portion 26. The surfaces 80 and 92 can have a contoured or curved shape. Preferably, the front edge 62 of the wing portion 70 is spaced a relatively small distance from the rear edge 76 of the visor 70 so that the visor 70 looks integral with the console assembly 10, and an exposed surface 80 of the visor 70 is generally flush with an exposed surface 82 defined by the bin door 66 of the wing portion 26. Preferably, the front edge 62 of the wing portion 70 is spaced by a distance less than about 5 centimeters from the rear edge 76 of the visor 70, and more preferably by a distance less than about 2 centimeters when the visor 70 is in its stowed position. A front portion of the headliner panel 14 and the front edge 62 of the wing portion 70 forms a recess 84 for receiving the visor 70, thereby blending the appearance of the visor 70 into the console assembly 10.

Preferably, the wing portions 26 and 28 have recesses 90 formed therein adjacent the respective front edges 62. The recesses 90 provides an access for gripping the edge 76 of the visor 70. Thus, if the distance between the front edge 62 of the wing portion 70 is relatively close to the rear edge 76 of the visor 70, and the exposed surfaces 80 and 82 are generally flush, the recess 90 enables the operator of the visor to grab the edge 76 to move the visor 70 into its lowered position.

As stated before, the console assembly 10 is modular such that the main console 20, the storage module 22, the video module 24, and the pair of wing portions 26 and 28 can be selectively put together to provide a console assembly. Thus, a customer purchasing a vehicle can select which of the modules that they want to include in the console assembly to be installed into the vehicle. For example, a customer may select only the main console 20 and the video module 24 from the plurality of available modules, e.g., the main console 20, the storage module 22, the video module 24, and the pair of wing portions 26 and 28. The main console 20 and the video module 24 are then installed or attached to the roof 12 of the vehicle, such that the front edge of the video module 24 is placed adjacent the rear end 32 of the main console 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An overhead console assembly for attachment to a vehicle roof having lateral edges, said overhead console assembly comprising:

a main console having a housing attached to the vehicle roof, said housing of said main console having a pair of opposed sides extending longitudinally along the vehicle roof; and a wing portion having a housing separate from said housing of said main console, said wing portion extending from one of said sides of said main console towards one of the lateral edges of the roof.

2. The console assembly of claim 1, wherein the wing portion extends substantially to the one of the lateral edges of the roof.

3. The console assembly of claim 2, wherein the wing portion has a free end spaced less than about 20 centimeters from the one of the lateral edges of the roof.

4. The console assembly of claim 1 further including a second wing portion extending from an opposed side of said main console.

5. The console assembly of claim 1, wherein said wing portion has a door pivotally attached to the wing portion for accessing a storage compartment.

6. An overhead assembly for a roof of a vehicle, said assembly comprising;

a visor pivotally attached to the roof, said visor having a rear edge, said visor movable from a first position in which said rear edge of said visor is positioned adjacent the roof, and a second position in which said rear edge of said visor is spaced from said roof;

a main console attached to the vehicle roof, said main console having sides extending longitudinally along the vehicle roof, said sides having a first longitudinal length; and a wing portion extending from one of said sides of said main console towards one of the lateral edges of the roof, wherein said rear edge of said visor is adjacent a front edge of said wing portion when said visor is in said first position, and wherein said wing portion has a second longitudinal length which is less than said first longitudinal length of said sides of said main console.

7. The overhead assembly of claim 6, wherein the wing portion has a recess formed therein adjacent said rear edge of said visor to provide access to said rear edge of said visor.

8. The overhead assembly of claim 6, wherein said rear edge of said visor is spaced from said front edge of said wing portion by less than about 5 centimeters.

9. The overhead assembly of claim 6, wherein said rear edge of said visor is spaced from said front edge of said wing portion by less than about 2 centimeters.

10. A method of assembling an overhead system for attachment to a roof of a vehicle, the method comprising the steps of:

a) providing a main console;
    b) attaching the main console to a roof of a vehicle;
    c) providing a plurality of modules attachable to the roof of the vehicle;
    d) selecting one of the plurality of modules; and
    e) attaching the one of the plurality of modules to the roof such that the one of the plurality of modules is adjacent the main console.

11. The method of claim 10, wherein the plurality of modules are selected from the group comprising:

a first module having storage compartments;
    a second module having a video monitor;
    a third module having a display;
    a fourth module having lights; and
    a fifth module having controls for a climate control system.

\* \* \* \* \*